3,315,787
DEVICE FOR THERMAL TREATMENT OF COMMODITIES PACKED IN CONTAINERS
Johannes B. van der Winden, Amstelveen, Netherlands, assignor to Gebroeders Stork & Co's Apparatenfabriek N.V., Amsterdam, Netherlands
Filed Dec. 14, 1965, Ser. No. 513,864
Claims priority, application Netherlands, Dec. 17, 1964, 6,414,701
4 Claims. (Cl. 198—131)

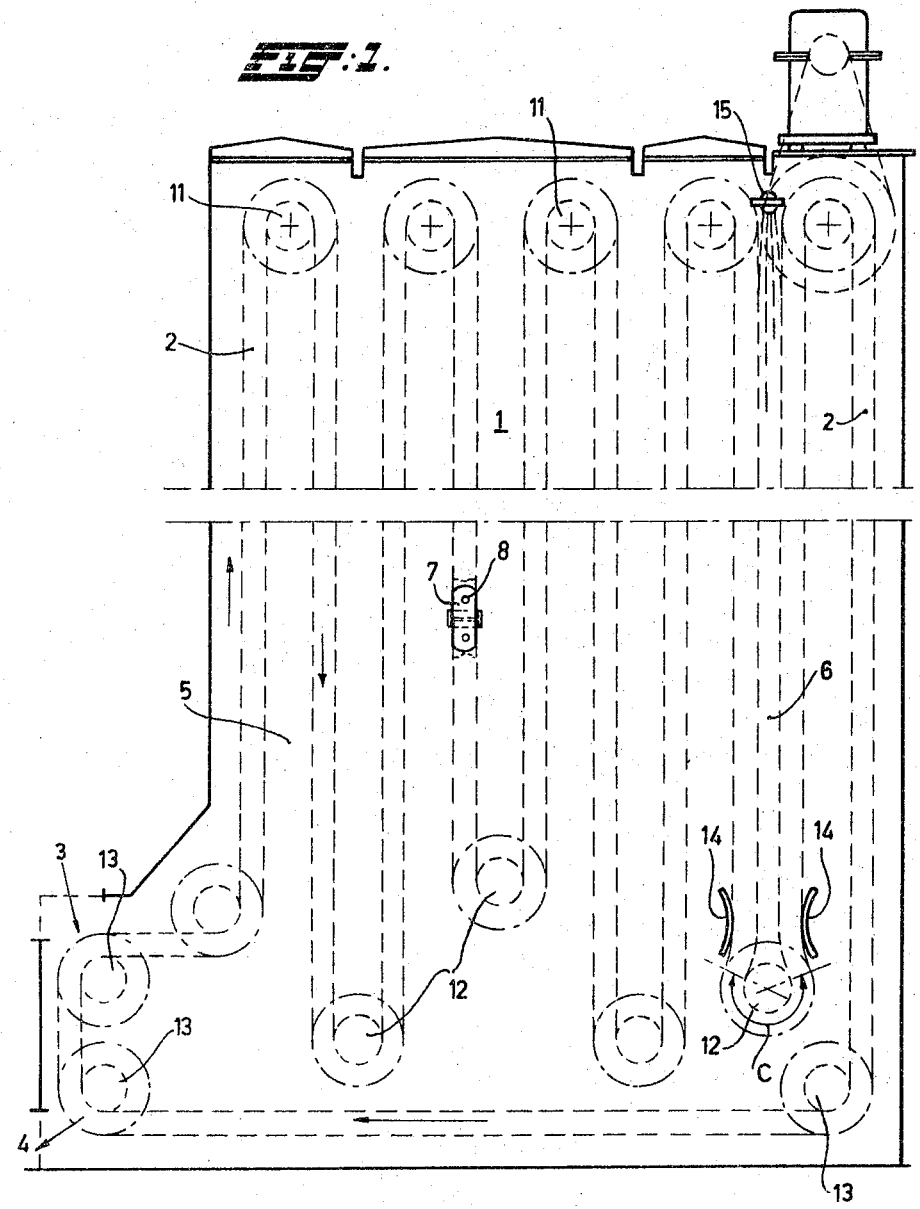

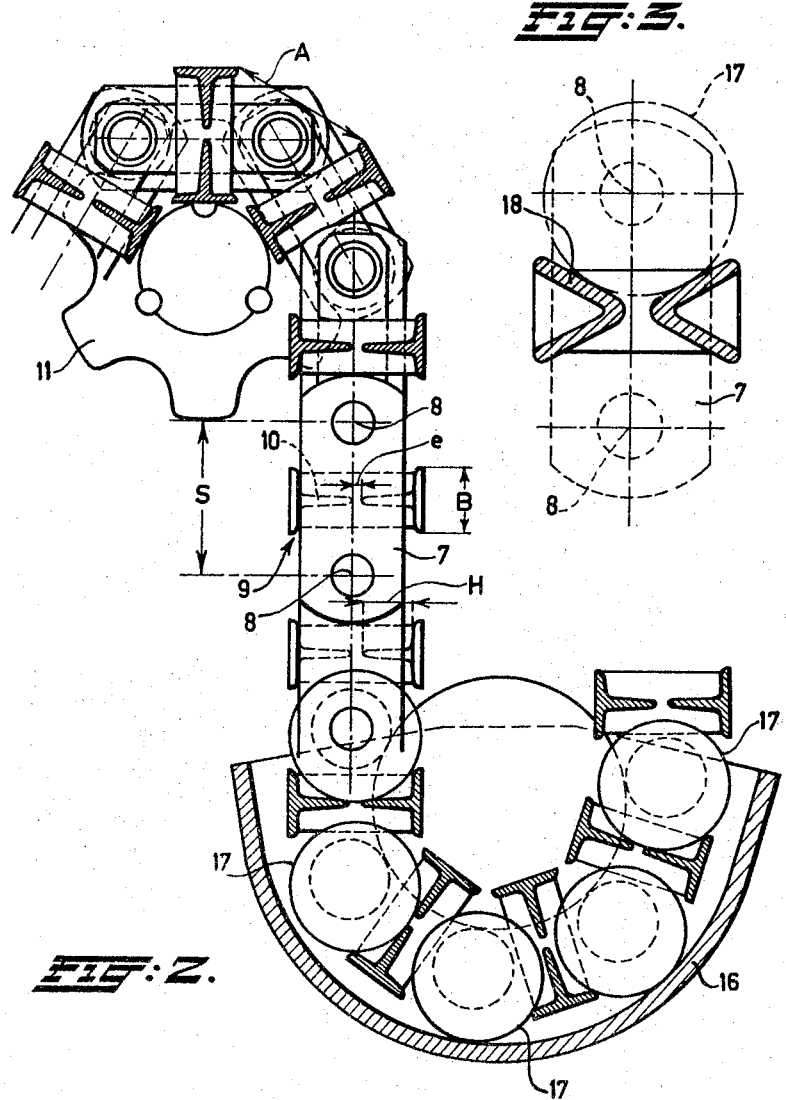

My invention relates to an apparatus for thermal treatment of commodities packed in containers, such as the pasteurization or sterilization of canned food stuffs. Such an apparatus generally comprises a chamber in which the containers receive treatment and through which an endless conveyor supported by a number of turning wheels advances along a loop-shaped path. The conveyor consists of a plurality of links interconnected by means of pivot pins. Each link has in its central area a carrying member consisting of profilated bars. Such an apparatus and modifications thereof are known. However, in order to enable the carrying members to round smoothly the curves and to permit these members to be filled and emptied, it was necessary to construct these members in a way such that their cost price was higher than when using a symmetrical structure in which universally available standardized profiles or shapes were employed.

It is an object of my invention to provide such an apparatus wherein the cost of construction of the carrying members is greatly reduced but no difficulties being experienced in the loading the containers into and discharging them from the carrying members. It is a further object of the present invention to provide a novel and improved carrying member structure for conveyors.

These objects are attained according to the invention by utilizing a carrying member consisting of two spaced, equal, profilated bars disposed in mirror image relationship. The widths of the bars—as contemplated in the direction of transport—amounts to such a part of the center to center distance between two successive pivot pins of the conveyor links that in the extreme pivoted position of two adjacent links the opening between the widths of the two associated carrying members is at least 90% of this center to center distance.

Due to these features an easily mounted symmetrical structure is obtained which as compared to the known carrying members provides a very efficient closure for the containers in the vertical track sections of the conveyor. This is of great importance when the conveyor in the vertical track part is moving through a liquid column since the force of gravity acting upon the containers (tins) is practically compensated by the upward pressure of the liquid and, if not retained in the conveyor, these containers start "floating" between the carrying members.

A further feature of my invention is to position two juxtaposed vertical parts of the conveyor close to one another so that it becomes possible to achieve a cooling in the last loop by simply disposing nozzles in the upper part of the chamber without the necessity of providing guide partitions for directing the cooling fluid onto the carrying members.

The foregoing and other objects and advantages of the invention will appear in the description to follow. In the description reference is made to the accompanying drawings, which form a part thereof, and in which there is shown by way of illustration and not of limitation a specific embodiment of the invention.

In the drawings:

FIG. 1 shows an elevational view of the apparatus with the conveyor system in dashed lines;

FIG. 2 shows to an enlarged scale a part of the conveyor of the device according to FIG. 1, the said part comprising an upper and a lower sprocket wheel; and FIG. 3 shows another embodiment of the carrying member of the conveyor according to FIG. 1 or 2.

As may be seen in FIG. 1 the apparatus consists of a treatment chamber 1 which is traversed by a conveyor 2 consisting of two parallel endless chains which follow a curved path. The apparatus is further provided with a supply station 3 for containers to be treated, in this case tins, and a discharge station 4. To start from the supply station 3 the conveyor passes through a first loop 5, which serves for heating. After having traversed the chamber 1 the conveyor 2 rounds a last loop 6 which serves for cooling.

As seen in FIG. 2 each chain of the conveyor 2 consists of a plurality of links 7 interconnected via pivot pins 8. Each link 7 in its central area is provided with a carrying member 9 consisting of profiled bars 10. In the embodiment according to FIG. 2 each profilated bar 10 is T shaped, the height H of its flange being equal to the width B of its foot. These two spaced and equal mirror image situated profilated bars 10 constitute together a carrying member. The aforementioned width B amounts to such a part of the center to center distance S between two successive pivot pins 8, that in the extreme pivoted position of two adjacent links 7 the opening A between the bases of two associated carrying members 9 is at least 90% of this center to center distance.

The value A is essential for loading and discharging the containers at the stations 3 and 4 respectively. The attainable value of the opening A is substantially determined by the ratio $B/S$ and for the rest by the distance $e$ between the tops of the flanges of a pair of the profilated bars 10. A possible embodiment has the following dimensions:

$$H = B = 35 \text{ mm.}$$
$$S = 87 \text{ mm.}$$
$$A = 80 \text{ mm.}$$
$$e = 5 \text{ mm.}$$

The conveyor 2 is guided along its looped path by a number of upper turning wheels 11 and lower turning wheels 12 and four additional guiding wheels 13. The upper turning wheels 11 are sprockets fitted with six teeth, which is possible since the maximum supplement angle which two consecutive links 7 in present structure can make is almost 70°.

In previous conveyors such a construction was impossible, since a sprocket wheel with six teeth required that between two adjacent links of the conveyor, each link being provided with a carrying member, there should be a supplement angle of at least 60°. As a consequence of the aforementioned ratios in the dimensions of the carrying member additional pivotal play is obtained and it becomes possible to achieve an angle of practically 70°, which is more than sufficient to permit the conveyor passing smoothly over sprocket wheels having only six teeth.

A major advantage of the use of sprocket wheels with only six teeth is that the width of the curves formed by the conveyor within the chamber where treatment is received can be small. Accordingly, more loops may be provided without enlarging this chamber.

In that case the capacity of the apparatus can be increased due to an increase of the transport speed over the speed of the conventional device, while maintaining the same dwelling time of each container within the chamber of treatment. This faster speed also decreases the torsional forces produced in the driving shafts.

The rather small size of the sprockets 11 allows for the arrangement of the various loops of the conveyor 2 in close proximity to one another, so that for a definite number of these loops the outer dimensions of the apparatus are smaller than those of known comparable devices. It may be necessary in view of the size of the containers to be treated and with the minimum required axle diameter of the sprockets to provide the upper sprockets with seven or eight teeth. This is still an improvement as compared with the conventional carrying members.

In the loop 6 the distance between the two vertical parts is very small since the spacing of both associated upper sprockets 11 is smaller than the diameter of the pitch circle of a sprocket, especially of that of the lower sprocket 12. In order to make both parts of the loop 6 run parallel to one another, two guides 14 are provided against the conveyor on opposite sides of the loop in the proximity of the lower curve. Thus, the arc value C of the conveyor contact curve about the lower sprocket 12 is greater than 180°. Due to this construction, nozzles 15 may be mounted in the central area over the loop 6 in order to achieve a cooling effect, without it being necessary to mount guide plates for directing the cooling fluid. A guide plate 16 is provided at the location of the sprockets 12, so that the containers 17 (see FIG. 2) cannot leave the conveyor.

In the embodiment according to FIG. 3 each carrying member 9 consists of two spaced and equal mirror image situated V-shaped profilated bars 18 of which the width B meets the same requirements as mentioned hereinbefore in regard with the embodiment according to FIG. 2.

The construction of the carrying members in the device according to the invention has a number of advantages as compared with known carrying members. In the first place, the flexibility of the conveyor in both directions is considerable which promotes the compactness of the installation. In the second place the confinement of the containers between the carrying members while following the vertical conveyor parts is very efficient and better than in the case of carrying members which for the purpose of loading and discharging are constructed so as to have a reduced width on one side. In the third place the mounting is simplified in construction and the cost price per carrying member is reduced due to the use of two identical bars per carrying member.

While a preferred embodiment of the invention has been shown and described, it is to be understood that changes and variations may be made without departing from the spirit and scope of the invention as defined in the appended claims.

I claim:

1. In an apparatus for the treatment of goods in containers conveyed through a chamber, the combination of an endless conveyor arranged in a plurality of loops within a chamber, a plurality of wheels supporting said conveyor in loops, said conveyor comprising a plurality of links pivotally interconnected at the ends thereof, container carrying members extending from the central portions of said links, said carrying members each comprising a pair of laterally spaced parallel bars having similar cross sections but disposed in mirror image relationship to each other, each bar having a portion extending in the direction of movement of said conveyor, the widths of said bar portions as measured in said direction being such with respect to the distance between the centers of successive link pivot connections that in the extreme pivoted positions of two successive links the opening between the portions of their carrying members is at least 90% of said centers distance.

2. In an apparatus as claimed in claim 1 wherein said bars each have a T-shaped cross-section with the flanges of each pair of bars being directed at each other, the height of a flange being equal to the width of a foot as measured in said direction of movement.

3. In an apparatus as claimed in claim 1 wherein said bars each have a V-shaped cross-section with the apices of each pair of bars being directed toward each other with the widths of said bars being measured in the direction of movement.

4. In an apparatus as claimed in claim 1 wherein the distance between the centers of two adjacent upper wheels is less than twice the diameter of the pitch circle of these wheels, and guide means bearing against the lower portion of the conveyor loop formed by said two upper wheels so that the arc contact of said lower loop portion around its lower wheel is greater than 180°.

References Cited by the Examiner

UNITED STATES PATENTS

| 899,017 | 9/1908 | Arnold | 198—131 X |
| 2,243,879 | 6/1941 | Meyer | 198—131 |
| 3,211,275 | 10/1965 | Van Der Winden | 198—131 |

FOREIGN PATENTS 1,115,749   1/1956   France.

EVON C. BLUNK, *Primary Examiner.*

M. L. AJEMAN, *Assistant Examiner.*